United States Patent [19]

Devall et al.

[11] Patent Number: 4,679,580
[45] Date of Patent: Jul. 14, 1987

[54] VAPOR VENT CONTROL VALVE

[75] Inventors: Jeffrey E. Devall, Mt. Zion; Ronald E. Reinke, Decatur, both of Ill.

[73] Assignee: Borg-Warner Automotive, Inc., Troy, Mich.

[21] Appl. No.: 877,603

[22] Filed: Jun. 23, 1986

[51] Int. Cl.⁴ .............................................. F16K 17/36
[52] U.S. Cl. .......................................... 137/39; 137/43
[58] Field of Search .............................. 137/38, 39, 43

[56] References Cited

U.S. PATENT DOCUMENTS

| 3,200,214 | 8/1965 | Aubert |  |
|---|---|---|---|
| 3,242,937 | 3/1966 | Morin | 137/43 X |
| 3,550,717 | 12/1970 | Doty | 137/38 X |
| 3,586,015 | 6/1971 | Kitzner | 137/43 X |
| 3,586,016 | 6/1971 | Meyn | 137/43 X |

OTHER PUBLICATIONS

*Chassis and Body Service Manual* for the 1982, Buick, pp. 6e 1-12 and 1-13.

Primary Examiner—Robert G. Nilson
Attorney, Agent, or Firm—John W. Harbst

[57] ABSTRACT

A vapor vent control valve arrangement for a fluid tank is disclosed. The valve arrangement includes a solenoid operated valve with a normally-open parallel switch assembly and a normally-closed switch in an electrical circuit to activate the solenoid valve. An impact switch may also be provided as a safety precaution in the series circuit. The valve assembly is spring-biased to provide an over-pressure check valve function and also includes a back-pressure relief valve.

11 Claims, 4 Drawing Figures

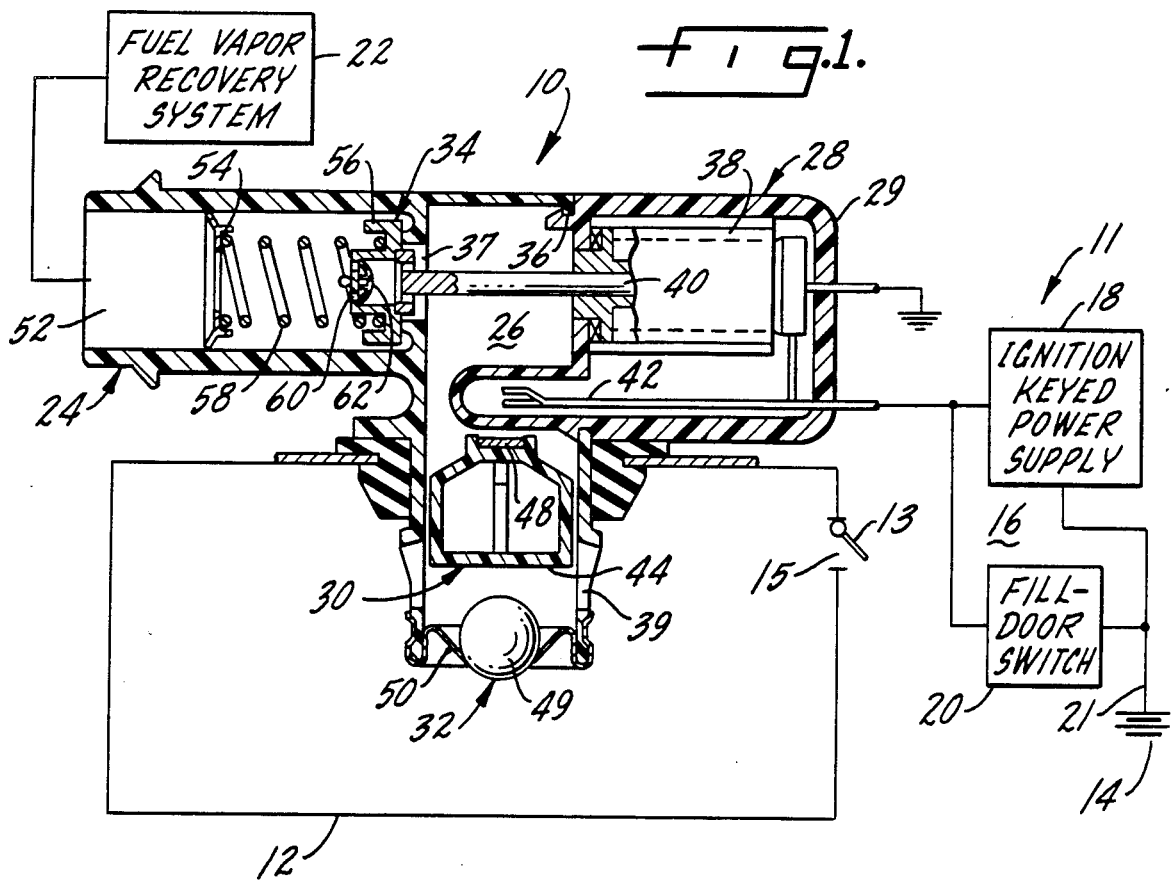
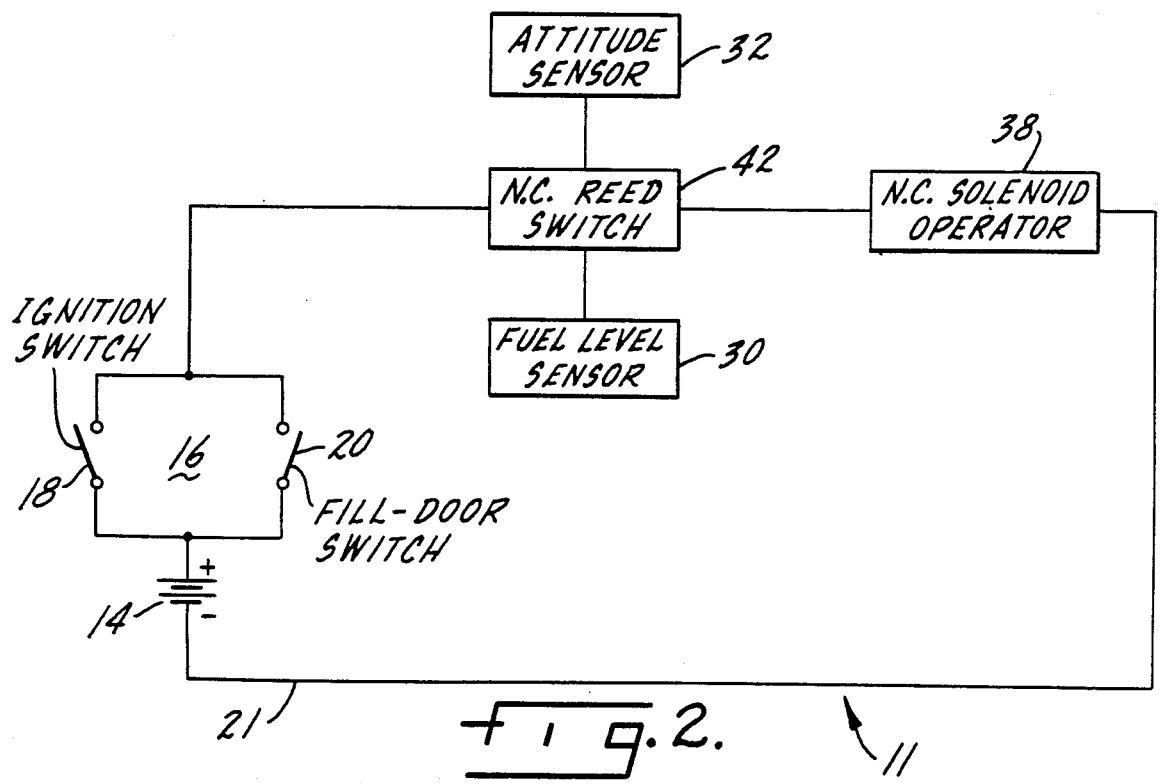

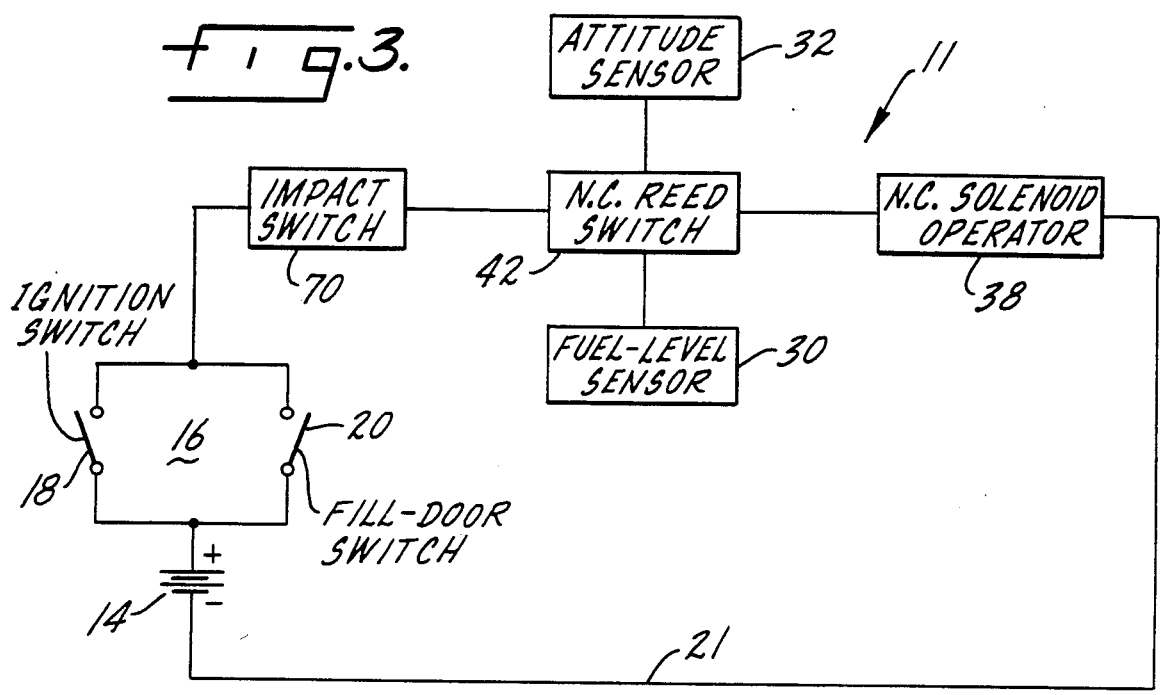
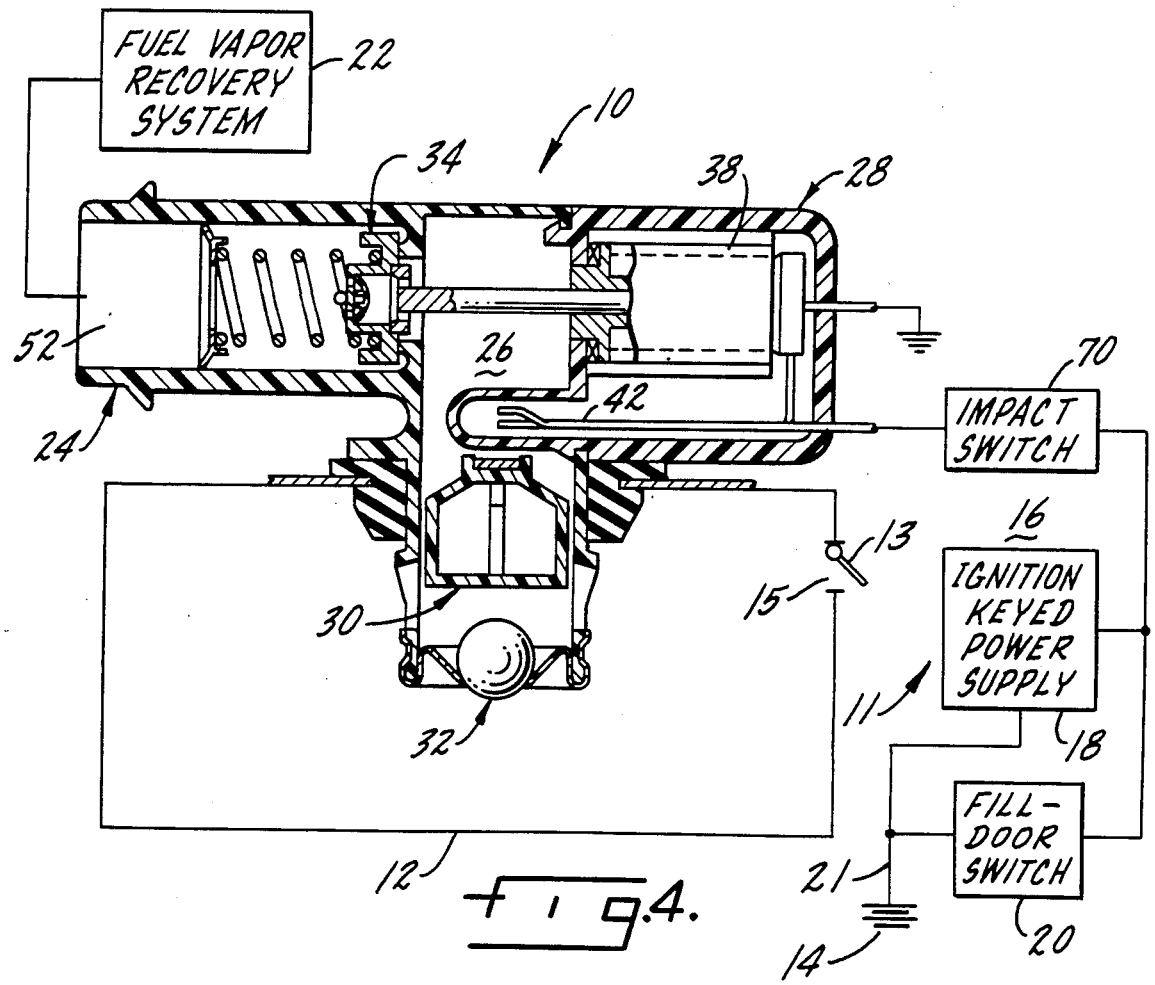

VAPOR VENT CONTROL VALVE

BACKGROUND OF THE INVENTION

1. Field of the Invention

The present invention relates to a vapor vent control valve arrangement for a fluid tank. More specifically, a slenoid operable valve is disclosed, which valve utilizes a spring-biased actuation means and a resilient member to provide a safety function. A specific embodiment is taught for an automobile fuel tank application.

2. Description of the Prior Art

A variety of control circuits and apparatus providing communication between a fuel tank and a vapor storage system or vapor consumption equipment are taught in the prior art. Vapor consumption equipment generally refers to injection or aspiration of captured vapors into an air-fuel mixing device for an automobile engine. Indicative of a cannister storage system is that shown in the *Chassis and Body Service* Manual for the 1982 Buick at page 6e 1-12 and 1-13. In the drawing illustrated therein, a vapor storage cannister is connected through a line to the top of a fuel tank. The single control element illustrated in the schematic drawing is a vent restrictor in the conduit between the fuel tank and cannister. Vapors from the fuel tank are transmitted to the vapor storage cannister, which is subsequently evacuated or purged to the air-fuel mixer during engine operation. Purge of this vapor storage cannister, which is charcoal filled, is provided through a purge solenoid which may be responsive to engine temperature or other operating parameters. A diagramatic view of the charcoal cannister is provided at FIG. 6e 1-16a of the aforementioned manual. The vent restrictor does not provide a seal means as a precautionary measure and is continually evacuating the fuel tank.

U.S. Pat. No. 3,586,016—Meyn discloses a control valve for a tank filling and evaporation arrangement which includes a buoyant member for the fuel level having a permanent magnet available to actuate a reed switch. The reed switch is in series with a pressure switch and a solenoid valve controlling flow between the fuel tank and the vapor storage means. The pressure switch is closed when the buoyant member is a lowered or rest position. The reed switch, which is in parallel with the fuel level and tank attitude sensing means, remains closed when the attitude sensing means is in the reference position. In addition, the pressure switch will close to complete the solenoid circuit only if the tank vapor pressure is high enough to actuate this pressure switch.

A similar system is disclosed in U.S. Pat. No. 3,586,015—Kitzner. However, the Kitzner patent includes a spherical weight movable on a ramp to open the reed switch in response to changes in tank attitude.

U.S. Pat. No. 3,200,214—Aubert discloses a magnetically-actuated reed switch. This reed switch is in a flow control device with a movable magnetic means therein.

U.S. Pat. No. 3,242,937—Morin teaches an air vent for a fuel tank with a set of adjustable floats which are raised by excess fuel to close a needle valve. The needle is also moved by an adjustable plate and lever assembly which rotates when the tank is tilted.

The above-described art discloses valve closing means generally utilizing magnetic operators and float control means in alternative series and/or parallel circuits. The invention disclosed herein requires only a single magnet, utilizes a parallel switch circuit in the series circuit, has a solenoid operator providing a relief valve arrangement in addition to a controllable valve, and a predetermined pressure level in the tank is not required to complete the circuit.

SUMMARY OF THE INVENTION

A tank filling and evaporative control valve apparatus is disclosed including a solenoid operated vent valve, an attitude sensing means and a fluid level sensing means. The solenoid operator in the preferred embodiment provides a communication path from a fuel tank to a vapor storage or consumption system. The solenoid is energized when an ignition or a fill-opening switch is closed to complete an electrical circuit. A float or fluid level sensing means with a magnetic device opens the electrical circuit if the fuel level is above a proscribed level. A preferred embodiment utilizes a normally-closed solenoid operator, wherein opening the electrical circuit closes the solenoid valve to seal fluid communication through the vapor vent. In addition, a means is provided to open the circuit and close the vent valve for an attitude change of the fuel tank. An impact switch may also be provided in this series circuit to open the circuit in the event of a traumatic impact, which impact switch would open the circuit and close the vapor vent thereby sealing a potential fuel leak path. The solenoid valve is a spring biased, normally-closed valve which provides a pressure-relief function and will allow a back pressure to evacuate to the tank in the event of an overpressure condition in the vapor recovery system.

DESCRIPTION OF THE DRAWING

In the figures of the drawing, like reference numerals identify like components and in the drawing:

FIG. 1 is a cross-sectional view of a preferred embodiment of the vent vapor valve;

FIG. 2 is an electrical schematic of the basic electrical circuit of this valve;

FIG. 3 illustrates an alternative embodiment of the electrical circuit; and

FIG. 4 illustrates the structure of FIG. 1 including the impact inertia switch illustrated in FIG. 3.

DETAILED DESCRIPTION OF THE INVENTION

A vapor vent control valve arrangement 10 for a fuel tank 12 with a fill-opening 15 and a fill-door 13 therefor is illustrated in FIGS. 1 and 4. Valve arrangement 10 is operably connected to an electrical circuit 11 which is coupled to an energy source 14 through a conductor 21. Circuit 11 includes a first switch or switch means arrangement 16, which is shown as a parallel arrangement of an ignition switch 18 and a fill-opening switch 20. As an example, fuel tank 12 may be considered as an automobile fuel tank associated with the electrical and fluid circuits of a vehicle.

The vapor vent control valve 10 is illustrated as seated atop fuel tank 12 to evacuate vapors therefrom to a fuel vapor recovery system 22. Valve arrangement 10 broadly comprises a housing 24, a solenoid assembly 28 including a casing 27 defining an enclosure 29 with a solenoid operator 38 therein, a fuel level sensor means 30, an attitude sensor means 32, and a valve subassembly 34. Solenoid operator 38 is electrically operable by completion of circuit 11.

Housing 24 defines a fuel chamber or fluid passage 26, a recovery or exhaust port 37, a fuel aperture or entry port 39 communicating between tank 12 and chamber 26, an opening 36 and a valve well 52. Solenoid 38 in enclosure 29 has a movable stem 40 extending from enclosure 29 through opening 36, passage 26 and port 37 into valve well 52. A reed switch or second switch means 42 in assembly 28 is in series with switch arrangement 16 and is operable to open electrical circuit 11 and thus close solenoid 38. As shown in FIGS. 1 and 4, reed switch 42 within assembly 28 extends into chamber 26.

Positioned in chamber 26 in proximity to reed switch 42 is a fluid level sensor 30 which is illustrated as a hollow float-like device 44 with a magnet 48. Attitude sensing means 32, also in chamber 26, is shown as a spherical element 49 positioned between float 44 and fuel tank 12 on a ramp-like cavity defined by a ramp 50. Spherical ball 49 is freely movable in response to attitude changes of fuel tank 12 to move float 30 with magnet 48 to open reed switch 42 by magnetic attraction.

Valve well 52 with a spring retainer means 54 positioned therein communicates with fluid passage 26 through exhaust port 37 and is directly coupled to vapor recovery means 22. Solenoid valve means 28 includes solenoid 38 and valve cap means 34, which contacts and is operable by stem 40 in well 52. Valve cap means 34 has a valve plate 56 which is biased to seal port 37 by a spring or bias means 58 positioned between spring retainer 54 and plate 56. Further, valve plate 56 defines a relief port 60 with a relief valve means 62 sealingly positioned over port 60 and operable to relieve back pressure in well 52.

Solenoid valve means 28 including stem 40, valve 56 and bias means 58 cooperate to act as an exhaust port seal and valve means. Solenoid 38 is operable to move an armature, in this case stem 40, in response to an electromagnetic field imposed by closing or completing the electric circuit 11. Circuit 11 is illustrated in FIG. 2 with energy source 14 connected to first switch means 16 by a conduit means or means for receiving energy 21. Switch arrangement 16 is connected in series with normally closed reed switch 42 and normally closed solenoid operator 38. Closure of either normally-open switch 18 or 20 of switch means 16, will complete circuit 11 to energize solenoid 38 and move stem 40 with valve plate 56 to open port 37. However, reed switch 42 may be opened, thus opening circuit 11, by attitude sensor 32 when the fuel tank attitude exceeds a predetermined angle from the reference position of FIG. 1, or by fuel level sensor 30 in response to an elevated fuel level. In addition, valve subassembly 34 provides a check-valve function to relieve an over-pressure condition in the fuel tank, when such over-pressure is sufficient to overcome the bias force of spring 58 and the inertia of stem 40.

In the alternative embodiment depicted in FIGS. 3 and 4, an impact switch 70 is disclosed in series in circuit 11 between switch means 16 and reed switch 42. Impact switch 70 is operable to open circuit 11 and seal communication through well 52 to fuel vapor recovery system 22 when a disturbance of sufficient magnitude opens switch 70.

Those skilled in the art will recognize that certain variations can be made in the illustrated embodiments. While only specific embodiments of the invention have been described and shown here, it is apparent that various alternatives and modifications can be made therein. It is, therefore, the intention in the appended claims to cover all such modifications and alterations as may fall within the true scope and spirit of the invention.

We claim:
1. A vapor vent control valve arrangement positioned between a fluid tank and a vapor recovery means comprising:
 a housing defining a fluid passage including an entry port and an exhaust port providing a fluid flow path between said tank and vapor recovery means;
 a solenoid valve means positioned to seal said exhaust port;
 a relief valve means in said solenoid valve means to relieve a back pressure downstream of said solenoid valve;
 a series circuit, including means for receiving electrical energy, a first switch means, a second switch means and said solenoid valve means;
 a buoyant float in said fluid passage, operable to open said second switch means;
 an attitude-responsive means, operable to move said buoyant float and thus open said second switch means;
 wherein actuation of said first switch means completes said series circuit and opens said solenoid valve means, thus providing fluid communication between said fluid tank and said vapor recovery means.

2. A vapor vent control valve arrangement for a fluid tank as claimed in claim 1, and further comprising an impact switch means in series with said second switch means, said impact switch means being operable to open said circuit and close said solenoid valve.

3. A vapor vent control valve arrangement positioned between a fluid tank and a vapor recovery means comprising:
 a housing defining a fluid passage including an entry port and an exhaust port providing a fluid flow path between said tank and vapor recovery means;
 a solenoid valve means positioned to seal said exhaust port being normally closed in a reference position;
 bias means to maintain said solenoid valve means in said reference position;
 a relief valve means in said solenoid valve means to relieve a back pressure downstream of said solenoid valve;
 a series circuit, including means for receiving electrical energy, a first switch means, a second switch means and said solenoid valve means;
 a buoyant float in said fluid passage, operable to open said second switch means;
 an attitude-responsive means, operable to move said buoyant float and thus open said second switch means;
 wherein actuation of said first switch means completes said series circuit and opens said solenoid valve means, thus providing fluid communication between said fluid tank and said vapor recovery means.

4. A vapor vent control valve arrangement, as claimed in claim 3, further comprising an impact switch means in series with said second switch means, said impact switch means being operable to open said circuit and close said solenoid valve.

5. A vapor vent control valve arrangement positioned between a fluid tank and a vapor recovery means comprising:
 a housing defining a fluid passage including an entry port and an exhaust port providing a fluid flow path between said tank and vapor recovery means;

a solenoid valve means positioned to seal said exhaust port;

a series circuit, including means for receiving electrical energy, a first switch means, a second switch means, said solenoid valve means and an impact switch means, said impact switch means being operable to open said circuit and close said solenoid valve;

a buoyant float in said fluid passage, operable to open said second switch means;

an attitude-responsive means, operable to move said buoyant float and thus open said second switch means;

wherein actuation of said first switch means completes said series circuit and opens said solenoid valve means, thus providing fluid communication between said fluid tank and said vapor recovery means.

6. A vapor vent control valve arrangement positioned between a fluid tank and a vapor recovery means comprising:

a housing defining a fluid passage including an entry port and an exhaust port providing a fluid flow path between said tank and vapor recovery means;

a solenoid valve means positioned to seal said exhaust port being normally closed in a reference position;

bias means to maintain said solenoid valve means in said reference position;

a series circuit, including means for receiving electrical energy, a first switch means, a second switch means, said solenoid valve means and an impact switch means, said impact switch means being operable to open said circuit and close said solenoid valve;

a buoyant float in said fluid passage, operable to open said second switch means;

an attitude-responsive means, operable to move said buoyant float and thus open said second switch means;

wherein actuation of said first switch means completes said series circuit and opens said solenoid valve means, thus providing fluid communication between said fluid tank and said vapor recovery means.

7. A vapor vent control valve arrangement positioned between a fluid tank and a vapor recovery means comprising:

a housing defining a fluid passage including an entry port and an exhaust port providing a fluid flow path between said tank and vapor recovery means;

a solenoid valve means positioned to seal said exhaust port being normally closed in a reference position;

bias means to maintain said solenoid valve means in said reference position, said solenoid valve being operable to open against said bias means in response to a vapor pressure above a predetermined level;

a series circuit, including means for receiving electrical energy, a first switch means, a second switch means, said solenoid valve means and an impact switch means, said impact switch means being operable to open said circuit and close said solenoid valve;

a buoyant float in said fluid passage, operable to open said second switch means;

an attitude-responsive means, operable to move said buoyant float and thus open said second switch means;

wherein actuation of said first switch means completes said series circuit and opens said solenoid valve means, thus providing fluid communication between said fluid tank and said vapor recovery means.

8. A vapor vent control valve arrangement positioned between an automobile fuel tank and a vapor recovery means, said fuel tank defining a fill-opening with a fill-door, said control valve arrangement comprising;

a housing defining a fluid passage including an entry port and an exhaust port providing a fluid flow path between said tank and vapor recovery means;

a solenoid valve means positioned to seal said exhaust port;

a series circuit, including means for receiving electrical energy, a first switch means, a second switch means and said solenoid valve means, said first switch means comprising a parallel arrangement of a fill-opening switch and an ignition switch means;

a buoyant float in said fluid passage, operable to open said second switch means;

an attitude-responsive means, operable to move said buoyant float and thus open said second switch means;

wherein actuation of said first switch means completes said series circuit and opens said solenoid valve means, thus providing fluid communication between said tank and said vapor recovery means.

9. A vapor vent control valve arrangement for an automobile fuel tank as claimed in claim 8, wherein said ignition switch means is an automobile ignition switch.

10. A vapor vent control valve arrangement for a fuel tank as claimed in claim 9, wherein said fuel tank fill-opening switch means is mounted in said fill-opening and operable by said fill-door.

11. A vapor vent control valve arrangement for a fuel tank as claimed in claim 8, wherein said fuel tank fill-opening switch means is mounted in said fill-opening and operable by said fill-door.

* * * * *